United States Patent [19]

Whitehead

[11] Patent Number: 5,426,312
[45] Date of Patent: Jun. 20, 1995

[54] FABRY-PEROT MODULATOR

[75] Inventor: Mark Whitehead, Santa Barbara, Calif.

[73] Assignee: British Telecommunications public limited company, London, England

[21] Appl. No.: 195,739

[22] Filed: Feb. 14, 1994

Related U.S. Application Data

[63] Continuation of Ser. No. 768,223, Oct. 15, 1991, abandoned.

[30] Foreign Application Priority Data

Feb. 23, 1989 [GB] United Kingdom ................ 8904185

[51] Int. Cl.$^6$ ................ H01L 31/0304; H01L 31/075; H01L 29/205
[52] U.S. Cl. ..................................... 257/21; 257/184; 257/432; 257/437; 257/458; 359/248
[58] Field of Search ............ 359/248; 357/4; 257/21, 257/184, 432, 437, 458

[56] References Cited

U.S. PATENT DOCUMENTS 4,346,244 10/1985 Miller .................................. 250/211

FOREIGN PATENT DOCUMENTS

| | | |
|---|---|---|
| 0245977 | 7/1987 | European Pat. Off. . |
| 0249645 | 12/1987 | European Pat. Off. ............ 359/248 |
| 61-226729 | 10/1986 | Japan . |
| 8403397 | 10/1984 | WIPO . |

OTHER PUBLICATIONS

Whitehead et al., *IEE Proceedings*, vol. 136, Pt. J. No. 1 Feb. 1989 "Investigation . . . Modulators".

Applied Physics Letters, "Electrodispersive Multiple Quantum Well Modulator," Oct. 1988, pp. 1684–1686; Y. H. Lee et al.

Electronics Letters, vol. 26, No. 19, Sep. 1990, Stevenage GB, pp. 1588–1590; Whitehead et al., "Very Low Voltage, Normally-Off Asymmetric Fabry-Perot Reflection Modulator".

Applied Physics Letters, vol. 55, No. 19, Nov. 1989, pp. 1946–1948; Yan et al., "Wide-bandwidth, High-efficiency Reflection Modulators Using an Unbalanced Fabry-Perot Structure".

Applied Physics Letters, vol. 53, No. 11, Sep. 1988, pp. 956–958, Whitehead et al. "Effects of Well Width on the Characteristics of GaAs/AlGaAs Multiple Quantum Well Electroabsorption Modulators".

Japanese Journal of Applied Physics, vol. 28, No. 8, Aug. 1989, pp. 1523–1524, Tomita et al., "Dispersive-Type Optical Bistqability in a Self-Electrooptic-Effect Etalon".

Optical Engineering, vol. 26, No. 5, May 1987, pp. 368–372, Miller, "Quantum Wells for Optical Information Processing".

IEEE Proceedings, vol. 136, p.t. J. No. 1, Feb. 1989, pp. 52–58; Whitehead et al., "Investigation of Etalon Effects in GaAs–AlGaAs Multiple Quantum Well Modulators".

Technical Digest of IEEE Colloquium, "Modelling of optoelectronic devices," Feb. 1990, pp. 8/1–8/4; Whitehead et al.: "Modelling the limits of low voltage opera- (List continued on next page.)

*Primary Examiner*—Jerome Jackson
*Attorney, Agent, or Firm*—Nixon & Vanderhye

[57] ABSTRACT

An asymmetric Fabry-Perot modulator comprises a multiple quantum well (MQW) p-i-n diode (8, 10, 12) defined by a front surface of reflectivity 0.3 and back surface of reflectivity 0.95. The cavity length L is such that resonance occurs close to the long wavelength side of the unbiased MQW absorption edge so that application of a bias signal to the MQW (12) causes the reflectivity of the cavity to become close to zero. This arrangement provides a high contrast modulator less sensitive to temperature variations and deviations from ideal reflectivities of the front and back surfaces than high-finesse Fabry-Perot modulators.

46 Claims, 4 Drawing Sheets

OTHER PUBLICATIONS tion for the BaAs Multiple quantum well asymmetric Fabry-Perot cavity modulator".

IEEE Photonics Technology Letters, vol. 1, No. 9, Sep. 1989, pp. 273-275; Yan et al.: "Electroabsorptive Fabry-Perot Reflection Modulators with Asymmetric Mirrors".

IEEE Photonics Technology Letters, vol. 2, No. 2, Feb. 1990, pp. 118-119, Yan et al.: "Extremely low-voltage Fabry-Perot reflection modulators".

Law et al., "Normally-off high contrast asymmetric Fabry-Perot reflection modulator using Wannier-Stark localization in a superlattice," Applied Physics Letters, vol. 56 (19) 7 May 1990, pp. 1886-1888.

Barnes et al., "GaAs/GaAlAs Multiple Quantum Well Optical Modulator Using Multilayer Reflector Stack Grown on Si Substrate," Electronics Letters, vol. 25, No. 15, pp. 995-996, 20 Jul. 1989.

Hutchings et al., "Unidirectional operation of a ring laser using an absorbing Fabry-Perot filter," Optics Letters, vol. 12, No. 5, May 1987, pp. 322-324.

Smith et al., "The demonstration of restoring digital optical logic", Nature, vol. 325, Jan. 1987, pp. 27-31.

Jelley et al., "Experimental determination of electro absorption in $GaAs/AS_{0.032}Ga_{0.68}$ of well width," Electronics Letters, vol. 24, No. 25, pp. 1555-1557, Dec. 1988.

Yan et al., "Extremely Low-Voltage Fabry-Perot Reflection Modulators," IEEE Photonics Tech. Lett., vol. 2, No. 2, Feb. 1990, pp. 118-119.

IEE Proceedings, vol. 136, Pt. J. No. 1, Feb. 1989, M. Whitehead et al.: "Investigation of et al on effects in GaAs-AlGaAs multiple quantum well modulators", pp. 52-58.

Patent Abstracts of Japan, vol. 11, No. 62 (P-551) (2509), 25 Feb. 1987, m 8 Oct. 1986.

FABRY-PEROT MODULATOR

This application is related to copending commonly assigned U.S. patent application Ser. No. 07/704,994, filed May 24, 1991 (claiming priority from GB 9011813.4, filed May 25, 1990) naming Mark Whitehead as inventor and entitled "Fabry-Perot Modulator." This is a continuation of application Ser. No. 07/768,223, filed Oct. 15, 1991, now abandoned.

BACKGROUND

I. Field of the Invention

This invention relates to Fabry-Perot modulators and in particular, but not exclusively, to those employing a multiple quantum well modulator.

II. Related Art and Other Considerations

Since the first observation of the effect of electric fields on the optical properties of GaAs-AlGaAs multiple quantum well (MQW) structures a number of optoelectronic devices have been demonstrated which exploit their enhanced electro-absorptive properties, e.g. fast intensity modulators and hybrid optical logic elements, both bistable and non-bistable. These devices employ an MQW layer grown epitaxially as the intrinsic region of a pin diode that can operate as an electro-absorptive modulator and efficient photodetector simultaneously.

A contrast ratio (on:off) of $\approx 2:1$ has been observed in devices with only $\approx 1$ μm of MQW absorber usually consisting of well and barriers $\approx 100$ Å thick. This is very efficient, given the device size, but a better contrast ratio is desirable. By 'contrast ratio' is meant the ratio of the high: low output states, irrespective of whether the device switches on or off with applied bias. 'Modulation' is the absolute change in state, which in reflection or transmission terms can only be between 0 and 1.

It would at first seem obvious simply to increase the thickness of the MQW layer to obtain better modulation figures. However, the situation is complicated by the background doping level of this layer which up to now has had a lower limit of $\approx 1 \times 10^{15}$ cm$^3$ in the best available material, and is routinely two or three times this value. This causes a significant fall-off in the electric field across the intrinsic region of the pin device which broadens the absorption edge of the MQW material even at zero bias and, moreover, produces a different red shift of the excitonic absorption in each well as an external bias is applied to the device for modulation. As the bias is increased the absorption edge broadening becomes worse due to the roughly parabolic dependence of the edge shift on applied field. So, instead of producing a larger change in the intensity of a transmitted or reflected beam of light the increase in thickness of the absorbing layer might only serve to distribute absorption changes over a wider spectral region and leave the modulation at the operating wavelength relatively unaffected.

Optimisation calculations have shown that if the residual doping is $2 \times 10^{15}$/cm$^3$ it is best to use about 45 wells of 100 Å GaAs separated by barriers of 100 Å Al$_{0.3}$Ga$_{0.7}$As confirming the limit of around 1 μm for the total thickness.

A second problem with increasing the MQW thickness is the additional bias voltage required to induce a given change in absorption. This would also be the main disadvantage in using narrower quantum wells e.g. 60 Å, where changes in absorption can be much greater because of the increased zero-bias exciton oscillator strength at the absorption edge and the greater resistance of the exciton to field-induced broadening, but the shift of the absorption edge with applied field is much reduced. It has been proposed that MQW devices may be integrated in 2-dimensional arrays with Si-based LSI electronics to form high-bandwidth optical interconnects, and in this case drive voltages for such modulators or logic gates will be limited to a few volts.

One method of improving modulation in a device that has limitations on its absorber thickness and drive voltage is to increase the effective optical path length by incorporating the MQW pin diode into a Fabry-Perot etalon.

An asymmetric Fabry-Perot modulator has been proposed which operates as a reflection modulator with a low reflectivity front surface and a high reflectivity back surface (Whitehead M., Parry G. and Wheatley P. "Investigation of etalon effects in GaAs-AlGaAs multiple quantum well modulators". IEE PROCEEDINGS, Vol. 136, Pt.J,Nol, February 1989 pp 52–58).

Modelling of one such a device demonstrated a maximum change in reflectivity of about 80°/o. However, it is desirable to have not only a large absolute change but to have a large modulation depth, or contrast ratio, i.e. the ratio of the maximum and minimum reflectivities. It is an object of the present invention to provide an asymmetric Fabry-Perot modulator having an improved contrast ratio. Accordingly there is provided a Fabry-Perot modulator comprising a resonant cavity defined by front and back reflective surfaces of different reflectivities and including an electro-absorptive means, the absorption of which can be increased by the application of an electrical bias signal to a value such that the reflectivity of the cavity is substantially zero at a resonant frequency of the cavity.

SUMMARY

Unlike the high finesse reflection modulators previously mentioned, the present invention operates at a resonant wavelength which remains at a high reflection state at zero bias because of the asymmetric nature of the cavity, thus giving improved insertion loss compared to non-resonant devices. High contrast modulation is achieved according to the present invention by bias-tuning the electro-absorption means in the cavity to a critical value for substantially zero reflectivity.

The electro-absorptive means is preferably a multiple quantum well (MQW) structure and in particular a GaAs-AlGaAs MQW structure.

The cavity length is chosen so that a reflection resonance occurs a few nano-metres to the long wavelength side of the unbiased MQW absorption edge where the absorption coefficient, $\alpha$, is initially low and the resonant reflection is high. The electro-absorption properties of the MQW can then be used to tune the cavity so that the reflection of the cavity, i.e. the reflectivity presented to an optical signal incident on the front surface of the cavity, is moved close to zero on application of the appropriate bias signal to the MQW.

Preferably the reflectivity of the front surface will be less than about 45°/o in order to obtain significant advantages over high-finesse MQW Fabry-Perot modulators in terms of insensitivity to deviation from the ideal surface reflectivities and to temperature effects on the absorption coefficient of the MQW. Conveniently the front surface is the untreated surface of the MQW modulator.

BRIEF DESCRIPTION OF THE DRAWINGS

Embodiments of the invention will now be described by way of example only with reference to the accompanying drawings in which.

DETAILED DESCRIPTION OF THE DRAWINGS

Figure 1:
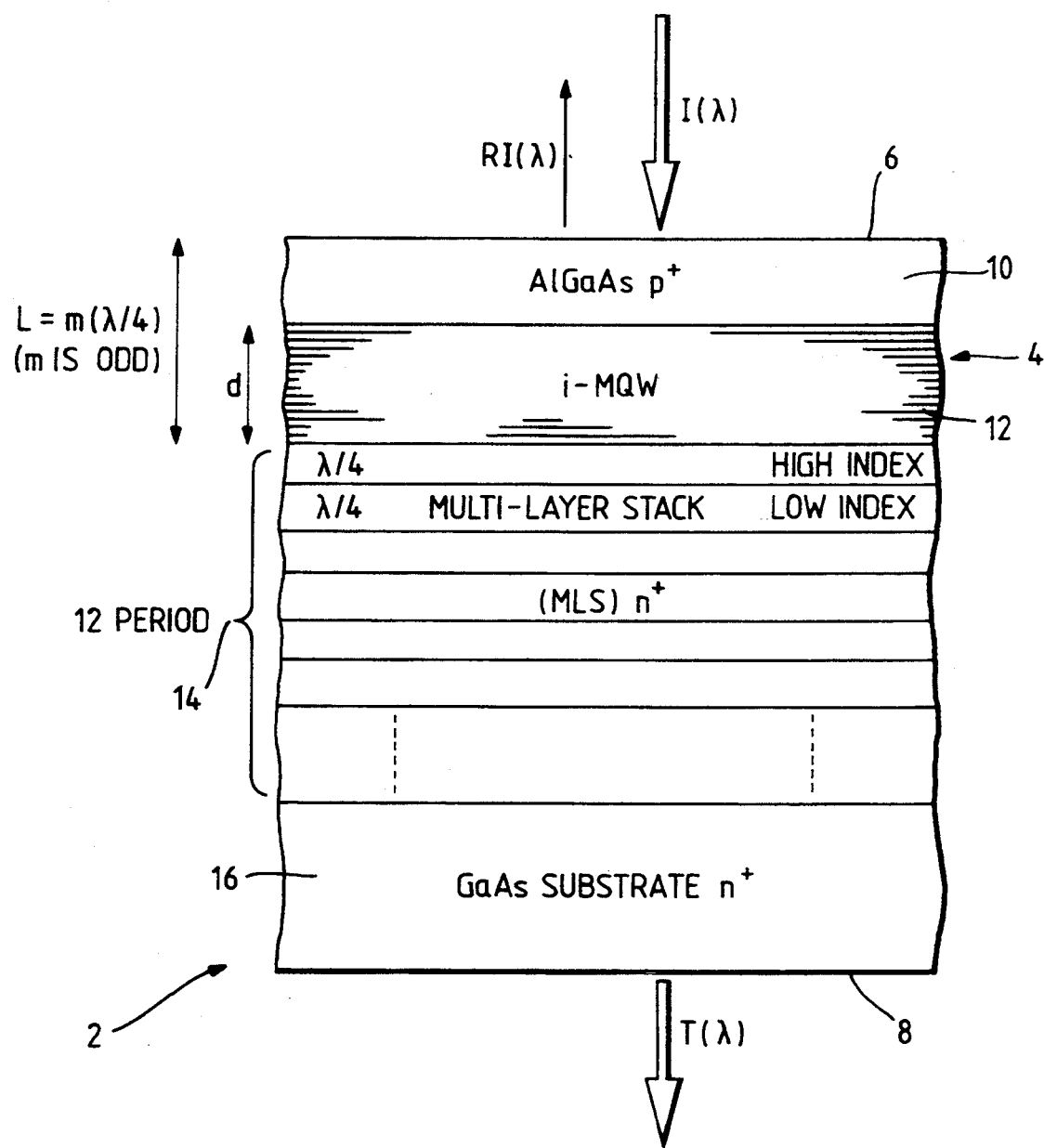
FIG. 1 is a schematic diagram of a model Fabry-Perot modulator according to the present invention.

Referring to FIG. 1 there is shown a Fabry-Perot modulator 2 comprising a resonant cavity 4 defined by a front reflective surface 6 of reflectivity Rf formed by the natural semiconductor surface and a back reflective surface 8 of reflectivity $R_b$. The cavity 4 is formed from a multiple quantum well pin diode having an AlGaAs p+ region 10, a 100 Å GaAs well 100 Å $Al_{0.3}Ga_{0.7}As$ barrier intrinsic MQW region 12, and a single, 12-period multi-layer back reflector stack 14 epitaxially grown on a GaAs n+ substrate 16 with $R_f=0.3$ and $R_b=0.95$. Fewer periods will lower the back reflectivity, more will increase it, but the actual value of $R_f$ is also determined by the components of the stack by their relative refractive indices. The absorption coefficient of the MQW device can be altered by the application of a bias voltage in a known manner. The resonant MQW etalon modulator of FIG. 1 was modelled in a simple way, with more emphasis on the electric field-induced absorption and refractive index changes in the MQW layer and the manner in which they combine with the properties of the basic resonant cavity, rather than considering in detail the subtleties of the multiple layers which may make up the cavity. For example, we have avoided multiple matrix-type calculations required to simulate the spectral reflectivity properties of dielectric stack mirrors. The main approximations made are (a) Spectral dispersion and spatial variation of the zero-bias cavity refractive index are ignored. By 'spatial variation' we refer to the index of the different layers of GaAs and AlGaAs that may make up the cavity. A weighted mean index $n_m$ of 3.37 was calculated for the cavity at 850 nm, based on the effective AlGaAs content of a typical MQW pin structure and published experimental index data for this material and this was kept constant throughout. The justification for this is that in the small wavelength band which would be considered for device operation the spectral variation of the refractive index is so small that it has no significant effect on the modulation characteristics. Furthermore, as long as the calculated mean index lies somewhere between that of GaAs and AlGaAs at the operating wavelength, there is no effect on the magnitude of the modulation achievable with a cavity of given finesse. The effect of the change in index induced by an applied electric field is a much more important consideration.

(b) The cavity mirrors are assumed to be 'hard' reflectors, i.e. we ignore the finite thickness of the mirrors which would be used in a practical device, and assume all reflections to occur at the interfaces between the cavity material and the mirrors. These would probably consist of multiple quarter-wavelengths of dielectrics of different refractive indices (when high finesse is required), plasma-deposited (in the case of dielectrics) and could either be evaporated or epitaxially integrated, perhaps as the p and n regions of the pin structure. The specific details of how the front and back surface reflectivities are achieved are not critical to the calculations of the optimum device modulation properties.

(c) We have not included the linear electro-optic (LEO) effect, which we would expect to become comparable to the electro-refractive effect only at longer wavelengths, outside the region considered here. The polarisation dependence of the LEO contribution to modulation has recently been observed in a high-finesse device.

The cavity length of the FIG. 1 arrangement is L, and is set at a value around 2.6 μm, which places the F-P resonance in the wavelength region of interest and is also in keeping with typical epitaxial structure thicknesses. The MQW active layer is of thickness d, which we keep fixed at 0.96 μm, taking into consideration field-induced broadening, as mentioned previously, and since this is the MQW thickness in the device which was used to determine electro-absorption, and hence, electro-refraction spectra. The use of a cavity length of 20 or any integer number of half-wavelengths is correct for the simulation as described by the equations above because it places the F-P resonance at the desired wavelength. When the figure 1 structure is modelled using full multi-layer matrix calculation methods then we find that in the case of the high finesse device (which would have another multilayer stack on top instead of the simple AlGaAs layer) the cavity thickness (length) L is defined only by the MQW thickness i.e. the MQW/MLS boundary defines the mirror reflection point. In this case the cavity thickness, L, must indeed be an integer number of ½ wavelengths (the operating wavelength). However, when modelling the asymmetric structure, the cavity is more likely defined by the total thickness of the MQW+AlGaAs top layer, and in this case, to put the F.P. resonance at the required wavelength, L must be an odd number of quarter wavelengths. Because of the asymmetry the cavity is subtly different from the high-finesse case, but the observation above has been confirmed by other workers with access to multi-layer simulation programs. For a cavity such as the one in FIG. 1, with a mean refractive index $n_m$ and linear absorption α (in the MQW region only), in the planewave approximation at normal incidence, the transmission T and reflection R are given by the following equations:

$$T = \frac{A}{(1 + F\sin^2\phi)} \quad R = \frac{(B + F\sin^2\phi)}{(1 + F\sin^2\phi)} \text{ where}$$

$$F = \frac{4R_a}{(1 - R_a)^2} \quad A = e^{-ad}\frac{(1 - R_f)(1 - R_b)}{(1 - R_a)^2}$$

$B = R_f(1 - R_a/R_f)^2/(1 - R_a)^2$
and
$R_a = (R_f R_b) e^{-ad} \phi = 2\pi n_m L/\lambda$
Cavity finesse $= (\pi/2) F^{\frac{1}{2}}$ From room temperature photocurrent measurements on a MQW pin diode containing 100 Å m GaAs quantum wells, with 100 Å Al$_{0.4}$Ga$_{0.6}$As barriers, we previously determined electro-absorption spectra in the wavelength range 750–920 nm. By performing a Kramers-Kronig integral on this data we have obtained the corresponding spectra for electro-refraction. Because of the minimal changes in absorption outside the wavelength range 780–900 nm, we set these as the limits for the Kramers-Kronig integral. These spectra actually take into account possible contributions from the field-induced 'forbidden' transitions which occur above the MQW absorption edge at energies below the n=2 subband edge and which begin to dominate the absorption spectra at high applied fields.

If we choose the cavity length so that a reflection resonance occurs a few nm to the long wavelength side of the unbiased MQW absorption edge, where α is initially low, then the resonant reflection must remain high (with a maximum value of ≈0.83, when α=0). The electro-absorptive properties of the MQW can then be used to tune the cavity so that R becomes as close as possible to zero. This requires the condition $$\alpha d = 0.5 \ln (R_b/R_f) \quad (1)$$

which, for our chosen reflectivities, means that αd ≈0.58. This is readily achievable in MQWs with little more than 1 μm of 100 Å wells and barriers.

Figure 2:
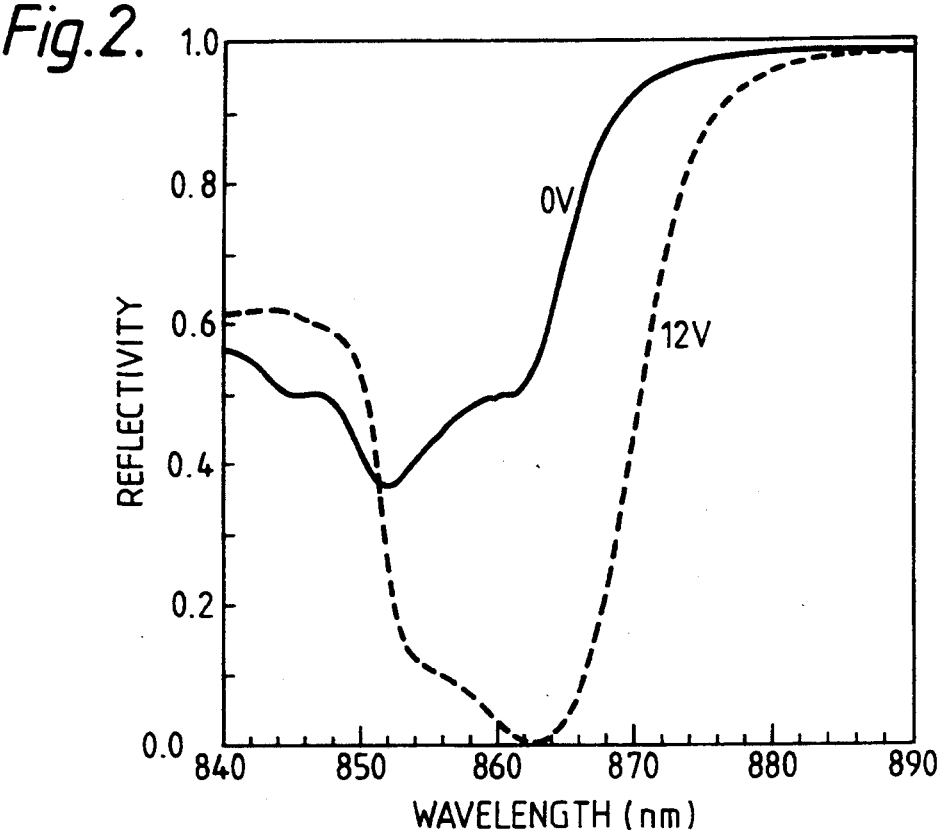
FIG. 2 is a graph of the calculated biased and unbiased reflectivity of the embodiment of FIG. 1.

FIG. 2 shows the 12 volt biased (off) and 0 V unbiased (on) reflectivity spectra for the device of FIG. 1. In the unbiased spectrum the MQW light and heavy hole excitonic absorption can be seen as minima at ≈844 nm and ≈851 nm respectively. The cavity resonance appears rather indistinctly at ≈862 nm, being strongly distorted by the rapid decrease of absorption with increasing wavelength in the region. The optimum operating wavelength is selected automatically in our calculation scheme to give the maximum contrast for a given upper limit on the insertion loss (in this case 3 dB). Having found the optimum wavelength, the cavity length is set so as to put the cavity resonance at the wavelength. Separate multilayer reflectivity calculations have shown that the combined AlGaAs and MQW thickness must be an odd number of λ/4 to put the resonance at the required point as explained in some detail previously. The MQW thickness d is set arbitrarily at a value of 1.20 μm, representing 60 periods of 100 Å GaAs+100 Å Al$_{0.3}$Ga$_{0.7}$As. At a wavelength of 862.8 nm the unbiased reflectivity is 0.552, with the biased reflectivity reduced to only 0.00242—a contrast of 227:1 and an insertion loss of ≈2.6 dB.

Figure 3:
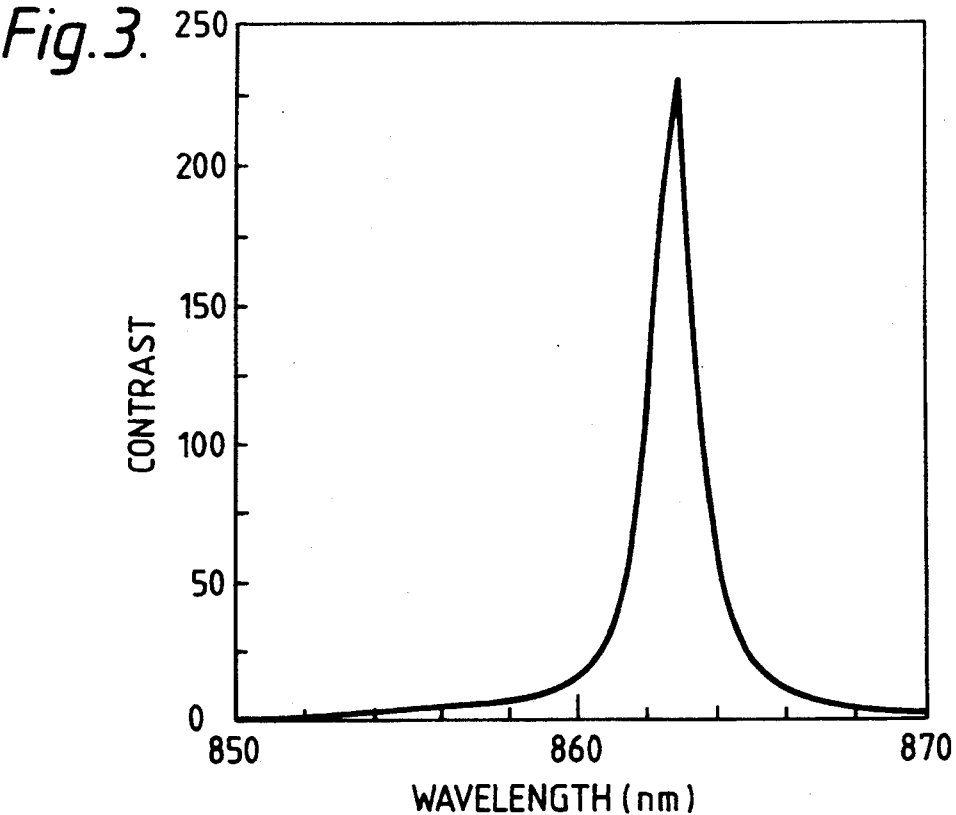
FIG. 3 is a graph of the calculated variation of contrast with input wavelength of the embodiment of FIG. 1.

FIG. 3 illustrates how the contrast varies with input wavelength for the fixed cavity length of 2.560 μm. The modulation spectrum has a FWHM of ≈2 nm. This compares favourably with ≈0.5 nm or less for higher finesse symmetric cavities, in which it is actually more difficult to achieve very high contrast. This is because, in order to make the unbiased reflectivity approach zero, mirror reflectivities must be both high and very close to equal, if operating far from the MQW absorption edge, or accurately mismatched to account for unbiased cavity absorption.

With the device we have described here it is possible to vary the bias, and thus the absorption, to tune the reflectivity through a minimum over a range of wavelengths near the absorption edge. Thus errors in the position of the reflection resonance due to growth or design inaccuracies can be compensated for to some extent. A range of calculations show that, with optimisation of the bias voltage, contrasts of at least 20:1 can be achieved over the range 855 to 865 nm with insertion loss decreasing to only 1.3 dB at the longest wavelength.

Figure 4:
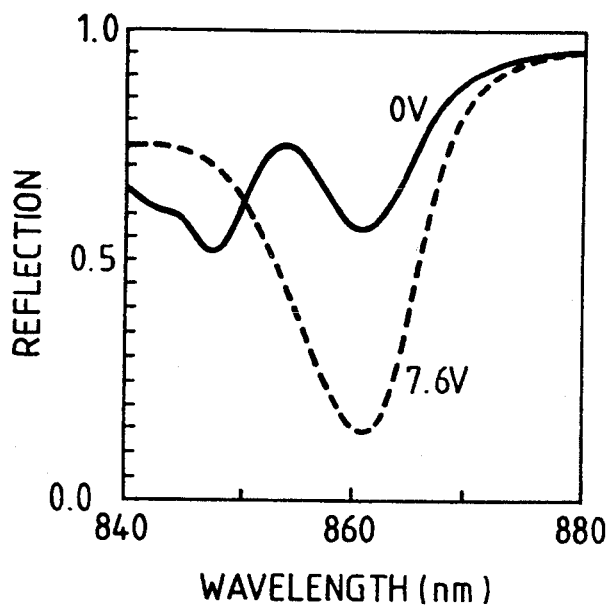
FIG. 4 is a graph of the actual biased and unbiased reflectivity for a device conforming to the model embodiment of FIG. 1 showing measured on-off reflection spectra for test AFPM at optimum bias.

Epitaxial integration of a back reflector stack within the MQW p-i-n structure is the most suitable way of fabricating the asymmetric Fabry-Perot modulator (AFPM) of FIG. 1. In order to demonstrate the basic operating characteristics of the device, we first modified existing MQW p-i-n transmission modulators by applying a highly reflective gold coating to the back surface, leaving the natural semiconductor:air reflectivity at the front. This provides a thin asymmetric cavity (<3 μm) close to the specification modelled above. The MQW structure was grown by MOVPE and contained 50×90 Å GaAs quantum well with 60 Å Al$_{0.3}$Ga$_{0.7}$As barriers. The complete structure was in no way optimised, however the reflectivity modulation which was achieved was a significant improvement on previous results in terms of contrast per volt. FIG. 4 shows the on:off spectra for the optimum bias of 7.6 V. At 861 nm the contrast is 6 dB (4:1) and the insertion loss ≈2.4 dB. Resonant reflective modulators containing 80–100 quantum wells, which have given contrasts up to 9 dB have required more than twice the bias of the AFPM.

Figure 5:
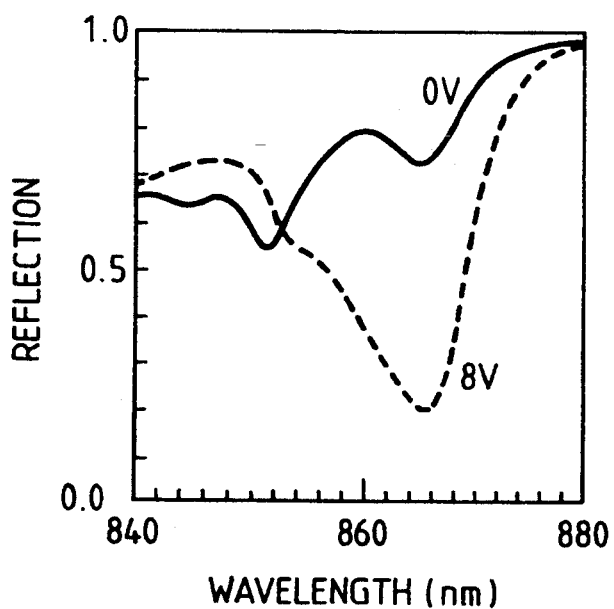
FIG. 5 is a graph of the calculated biased and unbiased reflectivity of the device of FIG. 4 using the model structure of FIG. 1 showing a stimulation of the on-off characteristics for test AFPM where cavity length is set so that resonance is the same distance from the MQW absorption peak as in FIG. 4.
Figure 6:
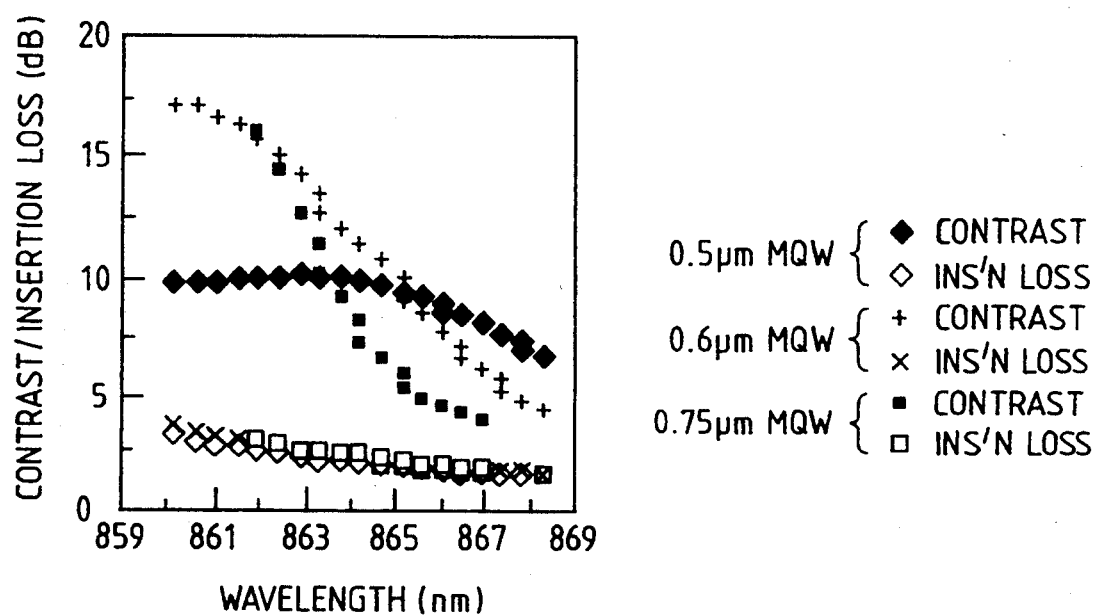
FIG. 6 is a graph of three further simulated embodiments of the present invention showing simulated performance of the modified AFPM with $R_f=0.45$, $R_b=0.95$, operating a fixed 5 volt bias, with different MQW thicknesses.

We find very good agreement between the experimental results and the modelled response of our test structure, which is displayed in FIG. 5. The contrast achieved is limited by there being insufficient MQW material in the cavity to satisfy equation (1), coupled with the F-P resonance being slightly too far away from the MQW absorption edge. The insertion loss at the resonant wavelength is higher than calculated, probably due to the absorption tail being underestimated.

An article by M. Whitehead, A. Rivers, G. Parry J. S. Roberts and C. Button, Electronics Letters Vol 25 No. 15, 20th July 1989 entitled "Low Voltage Multiple Quantum Well Reflection Modulator with on:off ratio>100:1" reports the demonstration of a high contrast, low-voltage multiple quantum well reflection modulator according to the present invention comprising an expitaxially integrated asymmetric Fabry-Perot modulator having an active MQW layer and a semiconductor quarter wave reflector stack as the back mirror, the front mirror being simply defined by the semiconductor/air interface. This achieved a contrast ratio in excess of 100:1 at normal incidence with an insertion loss of about 3.5 dB and only 9 V bias. Reflection changes of more than 40°/o were obtained over an optical bandwidth of 7 nm.

Details of the specific structure and the fabrication processes and experimental are contained in the above article all of which contents are incorporated herein by reference.

It has been suggested that MQW modulators would be an attractive interface device for optical interconnects between large scale electronic processors. We have carried out simulations to determined the prospects for an AFPM operating at no more than 5 V bias, this being compatible with existing CMOS. Calculations indicate contrasts in excess of 20 dB at 9–10 V bias using the standard structure, which is in good agreement with experiment. Reducing the bias to 5 V should still permit about 15 dB contrast for an optimized device, where the resonant wavelength is moved closer to the MQW absorption edge. Furthermore, it should be possible to get 10 dB contrast with only $\approx 3.3$ V at the upper limit of 3 dB insertion loss.

It should be noted that all the calculations and experimental results have been for a device containing an MQW structure with 100 Å GaAs wells and 60 Å AlGaAs barriers. The AlGaAs barriers are optically inactive (only the wells absorb) and there is some scope for reducing their thickness further to $\approx 40$ Å in order to reduce the bias voltage for the device.

With the bias voltage fixed at 5 V, the field across the MQW region falls with increasing thickness. For 0.5 $\mu$m of MQWs, the field is high enough to induce a significant shift of the absorption edge, and so the contrast remains, quite uniform over the range. For thicker MQW regions there is only an improvement of the contrast at wavelengths close to the absorption edge, where the reduced electric field still has effect. The fall-off in contrast becomes more rapid with increasing MQW thickness (decreasing field). We note also that the loss is fairly insensitive both to operating wavelength and MQW thickness.

Other electro-absorptive materials can be used for example bulk GaAs or InP instead of the MQW they however require increased bias voltage for the necessarily thicker active layers. The Fabry-Perot configuration according to the present invention also has at potential application as a wavelength-selective, high quantum efficiency photo-detector. For the AFPM, with bias at the resonant wavelength, what is not reflected is absorbed—and as $R_b$ is made closer to 1 (>0.95 anyway) the sum of T & R is only about 10°/o in this case and would be even less with optimisation. (In the high finesse structure in general what is not reflected is transmitted or vice versa). Experimental results confirm this. At $\sim 865$ nm, with bias, the photo current increases about 10-fold for the device of FIG. 4.

I claim:

1. A Fabry-Perot reflection modulator, comprising:
    a resonant cavity defined by a front reflector and a back reflector of different reflectivities,
    the front reflector having a reflectivity of between 0.3 and 0.45,
    the back reflector having a substantially greater reflectivity than the front reflector,
    the cavity including an electro-absorptive structure, the absorption of which can be increased by the application of a non-zero bias signal,
    the reflectivity of the cavity being greatest with zero bias and being a near-zero minimum with a predetermined applied bias signal, the ratio between the reflectivity with zero bias and that with said predetermined applied bias being at least 20 to 1.

2. A Fabry-Perot reflection modulator as in claim 28 wherein said electro-absorptive structure comprises a multiple quantum well structure.

3. A Fabry-Perot reflection modulator as in claim 2 wherein said quantum well structure comprises a GaAs - AlGaAs multiple quantum well structure.

4. A Fabry-Perot reflection modulator as in claim 3 wherein said quantran well structure comprises a plurality of 100 Å GaAs well and 100 Å $Al_{0.3}Ga_{0.7}As$ barrier intrinsic regions.

5. A Fabry-Perot reflection modulator as in claim 3 wherein said quantum well structure comprises a plurality of 90 Å GaAs well and 60 Å $al_{0.3}Ga_{0.7}As$ barrier intrinsic regions.

6. A Fabry-Perot reflection modulator as in claim 2 in which the multiple quantum well structure has barrier intrinsic regions $\leq 60$ Å thick.

7. A Fabry-Perot reflection modulator as in claim 2 in which the multiple quantum well structure has barrier intrinsic regions $\leq 40$ Å thick.

8. A Fabry-Perot reflection modulator as in claim 2 in which the multiple quantum well structure is $\leq 0.5$ $\mu$m thick.

9. A Fabry-Perot reflection modulator as in claim 1 wherein said electro-absorptive structure includes a multilayer back reflector stack epitaxially grown on a GaAs n+ substrate.

10. A Fabry-Perot reflection modulator as in claim 2 in which the front reflector comprises a surface of the multiple quantum well structure.

11. A Fabry-Perot reflection modulator as in claim 2 in which the multiple quantum well structure is part of a pin diode.

12. An optical signal modulator for modulating an input optical signal of substantially a predetermined optical frequency $f_1$, said modulator comprising:
    a Fabry-Perot resonant optical cavity having substantial but asymmetric internal cavity reflectivities and disposed to accept said input optical signal into said resonant cavity and to provide a modulated output optical signal from said cavity;
    an optical signal absorptive structure disposed within said cavity and having electrical bias connections which effect a frequency dependent change in the absorptive qualities of the absorptive structure as a function of an electrical bias signal applied thereto;
    the resonant frequency of said cavity being tunable substantially to equal and/or not to equal said predetermined frequency $f_1$ by changing said electrical bias signal,
    whereby the modulation contrast ratio exhibited by the modulator output optical signal is enhanced.

13. An optical signal modulator employing a resonant optical cavity defined by a front reflector and a back reflector of different reflectivities, wherein:
    the resonant optical cavity has a cavity length chosen to obtain a predetermined reflection resonance;
    the reflectivities of the front reflector and the back reflector of the cavity are chosen whereby reflectivity presented to an input optical signal incident on the front reflector of the cavity is switchable between a first level which is less than 0.1, upon the application of a non-zero electrical bias signal of a predetermined magnitude to the cavity, and a second higher level with zero applied bias, the ratio between the first and second levels being at least 20 to 1.

14. The modulator of claim 13, wherein the cavity length is chosen so that reflection resonance occurs on a long wavelength side of an unbiased absorption edge where an absorption coefficient is initially low and a resonance reflection is high.

15. The modulator of claim 13, wherein the optical length of the cavity is chosen to be an odd integer multiple of one quarter of an operating wavelength.

16. The modulator of claim 13, wherein the reflectivity of the front surface is less than about 0.45.

17. The modulator of claim 13, wherein the reflectivity of the front surface is 0.3 and the reflectivity of the back surface is 0.95.

18. The modulator of claim 13, wherein the cavity is formed from a multiple quantum well pin diode having:
   an AlGaAs p+ region;
   a 100 Å GaAs well 100 Å $Al_{0.3}Ga_{0.7}As$ barrier intrinsic MQW region; and
   a single, 12-period multi-layer back reflector stack epitaxially grown on a GaAs n+ substrate.

19. The modulator of claim 13, wherein the cavity comprises a plurality of quantum confinement regions.

20. An asymmetric Fabry-Perot reflection modulator comprising:
   a resonant cavity defined by a front reflector and a back reflector of different reflectivities and including an electro-absorptive means, the absorption of which can be increased by the application of a non-zero bias signal,
   the reflectivity of the cavity being switchable between a first value, with zero bias, and a lower second value, with a predetermined non-zero bias, the reflectivity with said predetermined non-zero bias being substantially zero, for example not more than 0.00242.

21. A modulator as in claim 20 wherein said electro-absorptive means comprises a multiple quantum well structure.

22. A modulator as in claim 21 wherein said multiple quantum well structure comprises a GaAs-AlGaAs multiple quantum well structure.

23. A modulator as in claim 22 wherein said multiple quantum well structure comprises a plurality of 100 Å, GaAs well and 100 Å $Al_{0.3}Ga_{0.7}As$ barrier intrinsic regions.

24. A modulator as in claim 22 wherein said multiple quantum well structure comprises a plurality of 90 Å GaAs well and 60 Å$Al_{0.3}Ga_{0.7}As$ barrier intrinsic regions.

25. A modulator as in claim 21 in which the multiple quantum well structure has barrier intrinsic regions $\leq 60$ Å thick.

26. A modulator as in claim 21 in which the multiple quantum well structure has barrier intrinsic regions $\leq 40$ Å thick.

27. A modulator as in claim 21 in which the multiple quantum well structure is $\leq 0.5$ $\mu$m thick.

28. A modulator as in claim 20 including as said back reflector a multilayer back reflector stack epitaxially grown on a GaAs n+ substrate.

29. A modulator as in claim 21 in which the front reflector comprises a surface of the multiple quantum well structure.

30. A modulator as in claim 21 in which the multiple quantum well structure is part of a pin diode.

31. A modulator as in claim 20 in which the reflectivity of the front reflector is less than 45%.

32. An asymmetric Fabry-Perot modulator comprising:
   a resonant cavity defined by a front reflector and a back reflector of different reflectivities,
   the front reflector being defined by an interface which is devoid of effective anti-reflection structures,
   the rear reflector having a reflectivity substantially greater than that of the front reflector,
   the cavity including an electro-absorptive means whose absorption can be increased by the application of a bias signal, the reflectivity of the cavity being greatest when unbiased,
   the modulator being configured for operation at an operating wavelength $\lambda$, the optical length of the resonant cavity being an odd multiple of $\lambda/4$, wherein the reflectivity of the cavity falls to substantially less than 0.01 with a predetermined applied bias signal.

33. A modulator as in claim 32 wherein said electro-absorptive means comprises a multiple quantum well structure.

34. A modulator as in claim 33 wherein said multiple quantum well structure comprises a GaAs-AlGaAs multiple quantum well structure.

35. A modulator as in claim 34 wherein said multiple quantum well structure comprises a plurality of 100 Å GaAs well and 100 Å $Al_{0.3}Ga_{0.7}As$ barrier intrinsic regions.

36. A modulator as in claim 34 wherein said multiple quantum well structure comprises a plurality of 100 Å GaAs well and 100 Å $Al_{0.3}Ga_{0.7}As$ barrier intrinsic regions.

37. A modulator as in claim 33 in which the multiple quantum well structure has barrier intrinsic regions $\leq 60$ Å thick.

38. A modulator as in claim 33 in which the multiple quantum well structure has barrier intrinsic regions $\leq 40$ Å thick.

39. A modulator as in claim 33 in which the multiple quantum well structure is $\leq 0.5$ $\mu$m thick.

40. A modulator as in claim 32 including as said back reflector a multilayer back reflector stack epitaxially grown on a GaAs n+ substrate.

41. A modulator as in claim 33 including as said back reflector a multilayer back reflector stack epitaxially grown on a GaAs n+ substrate.

42. A modulator as in claim 33 in which the multiple quantum well structure is part of a pin diode.

43. A modulator as in claim 32 in which the reflectivity of the front reflector is less than 45%.

44. A method of modulating an optical signal of wavelength $\lambda$, which method includes the steps of:
   (i) applying the optical signal to a first reflector of a Fabry-Perot modulator, which Fabry-Perot modulator comprises a resonant cavity defined by the first reflector and a second reflector, the second reflector having a reflectivity substantially greater than that of the first reflector, the cavity including an electro-absorptive means whose absorption can be increased by the application of a bias signal, the reflectivity of the cavity being greatest when unbiased, the optical length of the resonant cavity being an odd-integer multiple of $\lambda/4$; and
   (ii) applying an information carrying bias signal to the modulator to cause the reflectivity of the cavity to vary, whereby the optical signal impinging on the first reflector gives rise to a reflected signal carrying information from said bias signal.

45. A method of operating a Fabry-Perot reflection modulator comprising a resonant cavity defined by front and back reflective surfaces of different reflectivities and including an electro-absorptive means, the method comprising:

increasing the absorption of the electro-absorptive means by applying a bias signal to a value such that the reflectivity of the cavity falls substantially to zero at the resonant frequency of the cavity.

46. An optical signal processor comprising:

an asymmetric Fabry-Perot resonant optical cavity; and an electrically biased MQW Optical absorber disposed within said resonant cavity and capable of changing a resonant frequency of said cavity as a function of its electrical bias;

said resonant cavity having a length which causes its reflection resonance wavelength to be slightly longer than the unbiased MQW absorption edge wavelength.

* * * * *